(12) United States Patent
Biswas et al.

(10) Patent No.: US 12,406,486 B2
(45) Date of Patent: Sep. 2, 2025

(54) SYSTEMS AND METHODS FOR MANIPULATED IMAGE DETECTION AND IMAGE RECONSTRUCTION

(71) Applicant: Verizon Patent and Licensing Inc., Basking Ridge, NJ (US)

(72) Inventors: Subham Biswas, Thane (IN); Saurabh Tahiliani, Noida (IN)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 335 days.

(21) Appl. No.: 17/933,902

(22) Filed: Sep. 21, 2022

(65) Prior Publication Data
US 2024/0096075 A1    Mar. 21, 2024

(51) Int. Cl.
*G06V 10/00* (2022.01)
*G06V 10/70* (2022.01)
*G06V 10/776* (2022.01)
*G06V 10/778* (2022.01)
*G06V 10/82* (2022.01)

(52) U.S. Cl.
CPC ............ *G06V 10/82* (2022.01); *G06V 10/768* (2022.01); *G06V 10/776* (2022.01); *G06V 10/7796* (2022.01)

(58) Field of Classification Search
None
See application file for complete search history.

(56) References Cited

U.S. PATENT DOCUMENTS

| | | | |
|---|---|---|---|
| 2017/0017834 A1 | 1/2017 | Sabitov et al. | |
| 2020/0293820 A1 | 9/2020 | Mathada | |
| 2020/0402223 A1* | 12/2020 | Ghosh | G06N 20/00 |
| 2021/0319240 A1* | 10/2021 | Demir | G06V 40/40 |
| 2021/0342983 A1* | 11/2021 | Lin | G06N 3/088 |
| 2022/0051479 A1 | 2/2022 | Agarwal | |
| 2022/0157014 A1 | 5/2022 | Sevastopolskiy | |
| 2022/0366194 A1* | 11/2022 | Ghosh | G06N 7/01 |

(Continued)

FOREIGN PATENT DOCUMENTS

| | | | | |
|---|---|---|---|---|
| CN | 112991239 A | * | 6/2021 | .......... G06N 3/0454 |
| WO | 2021/230863 | | 11/2021 | |

OTHER PUBLICATIONS

H. Wu and J. Zhou, "IID-Net: Image Inpainting Detection Network via Neural Architecture Search and Attention," in IEEE Transactions on Circuits and Systems for Video Technology, vol. 32, No. 3, pp. 1172-1185, Mar. 2022, doi: 10.1109/TCSVT.2021.3075039 (Year: 2022).*

(Continued)

*Primary Examiner* — Amir Alavi (57) ABSTRACT

A method may include receiving a number of images to train a first neural network, masking a portion of each of the images and inputting the masked images to the first neural network. The method may also include generating, by the first neural network, probable pixel values for pixels located in the masked portion of each of the plurality of images, forwarding the images including the probable pixel values to a second neural network and determining, by the second neural network, whether each of the probable pixel values is contextually suitable. The method may further include identifying pixels in each of the plurality of images that are not contextually suitable.

20 Claims, 9 Drawing Sheets

(56) References Cited

U.S. PATENT DOCUMENTS

2023/0259587 A1\* 8/2023 Lin ........................... G06T 5/60
2024/0029460 A1   1/2024 Brown

OTHER PUBLICATIONS

T. Alt, P. Peter, and J. Weickert, "Learning sparse masks for diffusion-based image inpainting," Lecture Notes in Computer Science, pp. 528-539, 2022. doi:10.1007/978-3-031-04881-4_42 (Year: 2022).\*

C. Huang, Q. Xu, Y. Wang, Y. Wang and Y. Zhang, "Self-Supervised Masking for Unsupervised Anomaly Detection and Localization," in arXIV:2205.06568v1, 2022, doi: 10.1109/TMM.2022.3175611 (Year: 2022).\*

Co-pending U.S. Appl. No. 18/145,279, filed Dec. 22, 2022 to Subham Biswas, et al. entitled Systems and Methods for Targeted Adjustment of Media, 40 pages.

\* cited by examiner

SYSTEMS AND METHODS FOR MANIPULATED IMAGE DETECTION AND IMAGE RECONSTRUCTION

BACKGROUND INFORMATION

With technological advancements, image manipulation is becoming more prevalent. Such image manipulation often causes problems with respect to the general public being able to trust the accuracy of an image and/or determine whether the image has been altered. For example, technologies associated with creating "deepfakes" are able to generate manipulated images which are essentially indistinguishable to the human eye from real images.

DETAILED DESCRIPTION OF EXAMPLE EMBODIMENTS

The following detailed description refers to the accompanying drawings. The same reference numbers in different drawings may identify the same or similar elements.

Implementations described herein provide one or more neural networks that are trained using pixel contextual knowledge-based processing to identify out-of-context pixels or pixel regions. For example, in one implementation, a first model, e.g., a first neural network, may process images that include masked regions to generate probable pixel values for the masked regions. A second model, e.g., a second neural network, may then use contextual awareness of the pixels with respect to surrounding pixels to determine whether each pixel in an image is out of context/not contextually suitable. The trained models or neural networks may then be used to identify manipulated regions of images and reconstruct the regions of the images that have been manipulated or digitally altered. In this manner, the models/neural networks may generate images that correspond to the images prior to the manipulation, as described in detail below.

Figure 1:
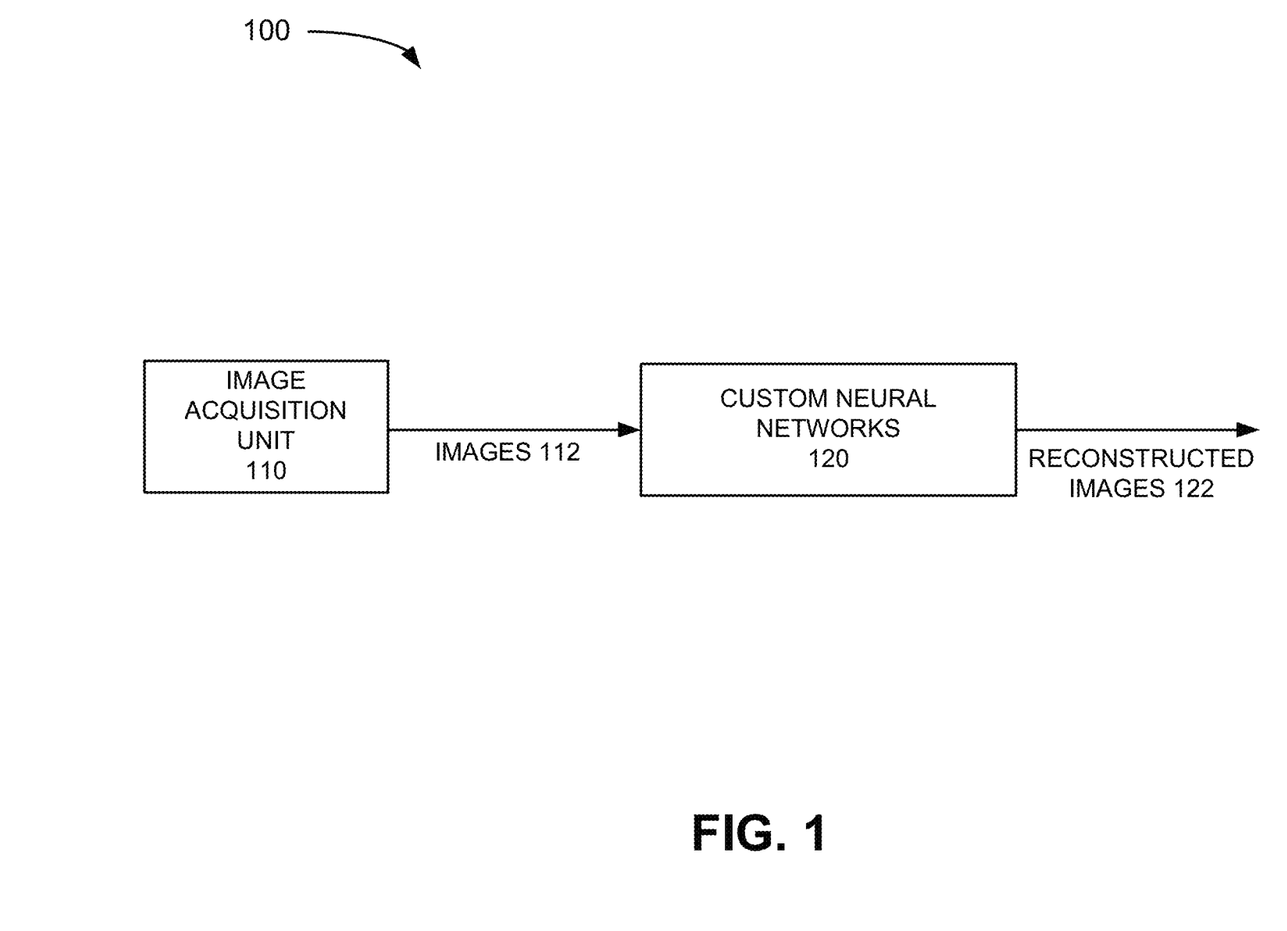
FIG. 1 illustrates an exemplary system used to detect manipulated images and generate reconstructed images in accordance with an exemplary implementation.

FIG. 1 is a block diagram of elements or components implemented in system 100 in accordance with an exemplary implementation. Referring to FIG. 1, system 100 includes image acquisition unit 110 and custom neural networks 120. In an exemplary implementation, image acquisition unit 110 may include a computer or processing device that receives and/or obtains images from any number of sources, such as the news media, websites, individuals, companies, etc. The obtained images 112 may include images that will be used to train custom neural networks 120. The obtained images 112 may also include images for which custom neural networks 120 will determine whether an image has been manipulated and/or reconstruct a manipulated image. Image acquisition unit 110 may forward images 112 to custom neural networks 120. In other implementations, image acquisition unit 110 may receive videos associated with training custom neural networks 120 and/or determining if any portion of the video has been manipulated. In this case, image acquisition unit 110 may forward videos to custom neural networks 120.

Custom neural networks 120 may include one or more computer devices, processors and/or logic for processing data received from image acquisition unit 110. In an exemplary implementation, custom neural networks 120 may include one or more deep neural network (DNNs) that each include a number of convolutional layers and a number of kernels or filters for each layer. In one exemplary implementation, custom neural networks 120 may include first and second neural networks 120 (e.g., DNNs) that are trained to predict contextually aware pixel values corresponding to portions of received images, as described in detail below.

Custom neural networks 120 may also generate images that "correct" the manipulated portion of the images to provide non-manipulated images corresponding to original images (e.g., images that existed prior to the manipulation). For example, after custom neural networks 120 have been trained, generated images, including manipulated images 112, may be provided to custom neural networks 120. Custom neural networks 120 may then identify out-of-context pixels and perform synthetic pixel/image generation to predict pixel values for portions of the manipulated image to reconstruct the images that have been manipulated. In other implementations, other processing devices, such as other machine learning devices, may be used to detect out-of-context pixels. In an exemplary implementation, custom neural networks 120 may output reconstructed images 122, as described in detail below.

The exemplary configuration illustrated in FIG. 1 is provided for simplicity. It should be understood that system 100 may include more or fewer devices than illustrated in FIG. 1. For example, system 100 may include multiple image acquisition units 110 and additional neural networks 120 that process the received data. In addition, system 100 may include additional elements, such as machine learning devices associated with masking portions of the images, as described in detail below, communication interfaces (e.g., radio frequency transceivers) that transmit and receive information via external networks to aid in analyzing images, etc.

In addition, various functions are described below as being performed by particular components in system 100. In other implementations, various functions described as being performed by one device may be performed by another device or multiple other devices, and/or various functions described as being performed by multiple devices may be combined and performed by a single device.

Figure 2:
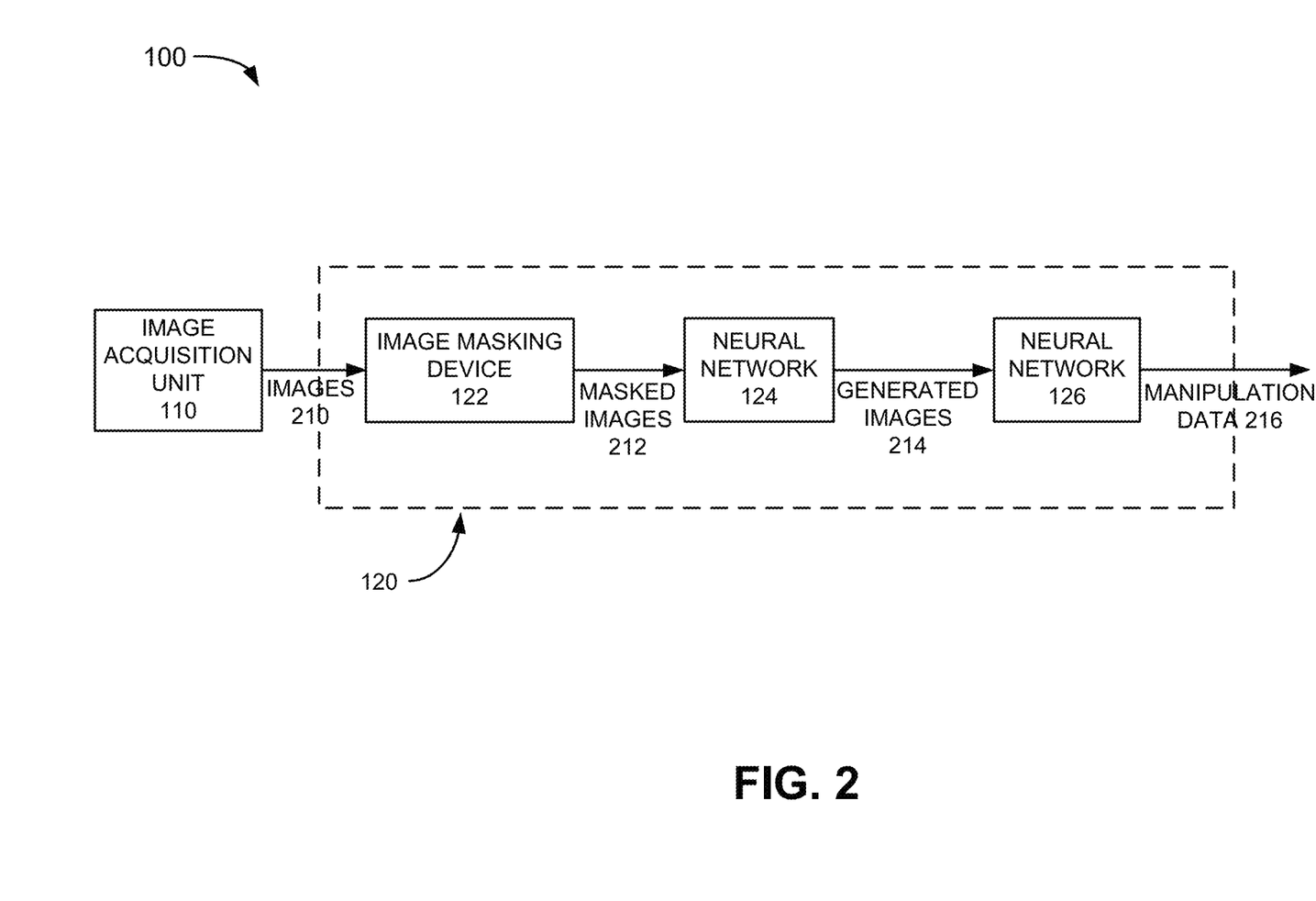
FIG. 2 is a diagram illustrating components of the system of FIG. 1 in accordance with an exemplary implementation.

FIG. 2 illustrates elements implemented in system 100 in accordance with an exemplary implementation. Referring to FIG. 2, custom neural networks 120 include image acquisition unit 110, image masking device 122, neural network 124 and neural network 126. As described above with respect to FIG. 1, a manipulated image may be generated by a party attempting to confuse a viewer into believing that the manipulated image is in fact, an image that has not been manipulated. In this implementation, custom neural networks 120 include two neural networks 124 and 126 that are trained to identify manipulated images.

In an exemplary implementation, neural networks 124 and 126 may operate in conjunction with image masking device 122 for training purposes. For example, thousands or millions of original, non-manipulated images 210 may be input to image masking device 122. The term "original image" as used herein refers to an image that has not been manipulated or digitally altered.

Image masking device 122 may include a computer device, processing device or processing logic that is used to mask various portions of received images 210. For example, in one implementation, image masking device 122 may include a machine learning interpretability (MLI) device that randomly masks portions of input images 210. The term "mask" as used herein should be construed to include changing values of pixels in an image, such as changing the pixel values to any particular value ranging from zero to 255 (e.g., changing the pixel values to 255, corresponding to the color white). The masked images 212 may be input to neural network 124 for training neural network 124. For example, during training, neural network 124 may predict contextually aware pixel values for the masked region and generate an image 214 based on the predictions. Generated images 214 may be input to neural network 126. Neural network 126 may then classify each pixel in the generated images as a generated pixel or an original pixel and output image manipulation data 216, as described in detail below.

Custom neural networks 120 illustrated in FIG. 2 may include additional elements that are not illustrated. For example, custom neural networks 120 may include additional neural networks and/or machine learning devices used to facilitate both training and the generation of corrected images, as described in detail below. It should also be understood that functions described as being performed by various elements in FIG. 2 may be performed by other elements/functions in other implementations.

Figure 3:
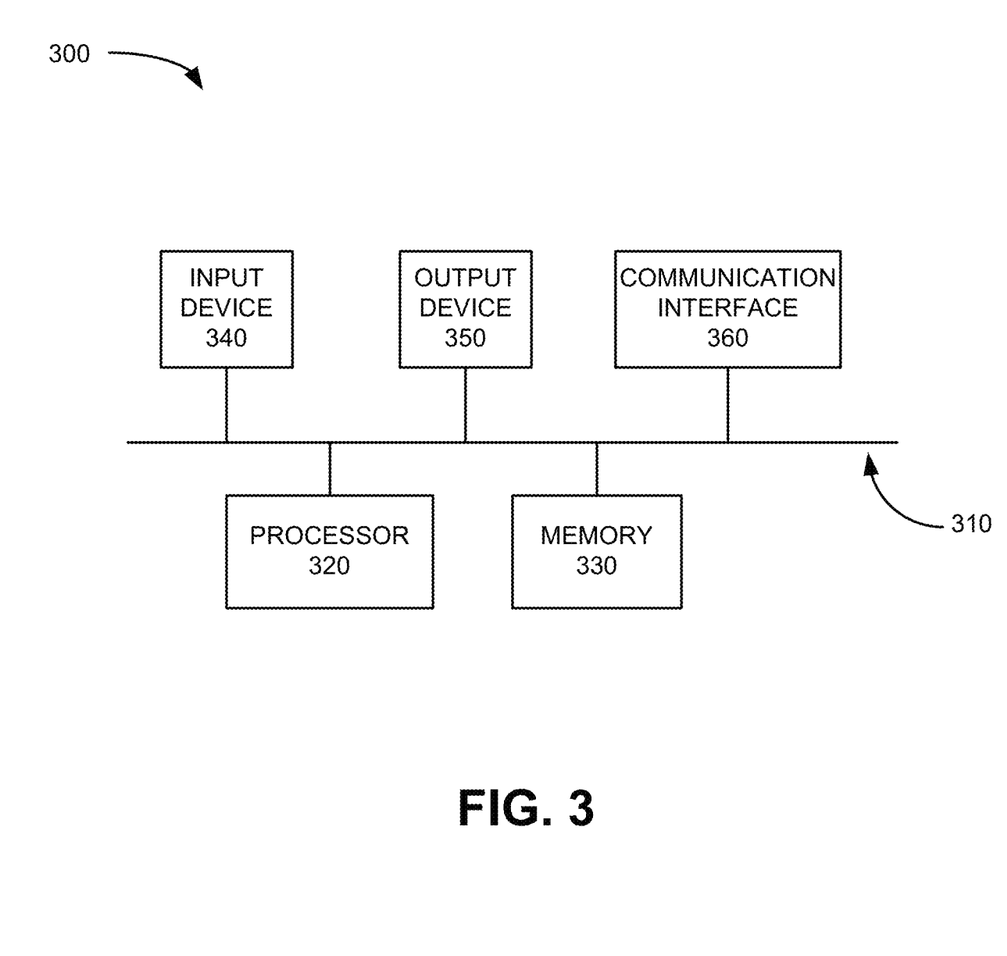
FIG. 3 is a block diagram of components implemented in one or more of the elements illustrated in FIGS. 1 and 2 in accordance with an exemplary implementation.

FIG. 3 illustrates an exemplary configuration of a device 300. One or more devices 300 may correspond to, be included in and/or be used to implement devices in environment 100, such as image acquisition unit 110, image masking device 122, neural network 124 and neural network 126. Referring to FIG. 3, device 300 may include bus 310, processor 320, memory 330, input device 340, output device 350 and communication interface 360. The exemplary configuration illustrated in FIG. 3 is provided for simplicity. It should be understood that device 300 may include more or fewer components than illustrated in FIG. 3.

Bus 310 may connect the elements illustrated in FIG. 3. Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SSD). Memory 330 may also include a magnetic and/or optical recording medium (e.g., a hard disk) and its corresponding drive.

Input device 340 may include a mechanism that permits a user to input information, such as a keypad, a keyboard, a mouse, a pen, a microphone, a touch screen, voice recognition and/or biometric mechanisms, etc. Output device 350 may include a mechanism that outputs information to the user, including a display (e.g., a liquid crystal display (LCD)), a speaker, etc. In some implementations, device 300 may include a touch screen display may act as both an input device 240 and an output device 350.

Communication interface 360 may include one or more transceivers that device 300 uses to communicate with other devices via wired, wireless or optical mechanisms. For example, communication interface 360 may include one or more radio frequency (RF) transmitters, receivers and/or transceivers and one or more antennas for transmitting and receiving RF data. Communication interface 360 may also include a modem or an Ethernet interface to a LAN or other mechanisms for communicating with elements in a network.

In an exemplary implementation, device 300 performs operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), solid state drive (SSD), etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4A:
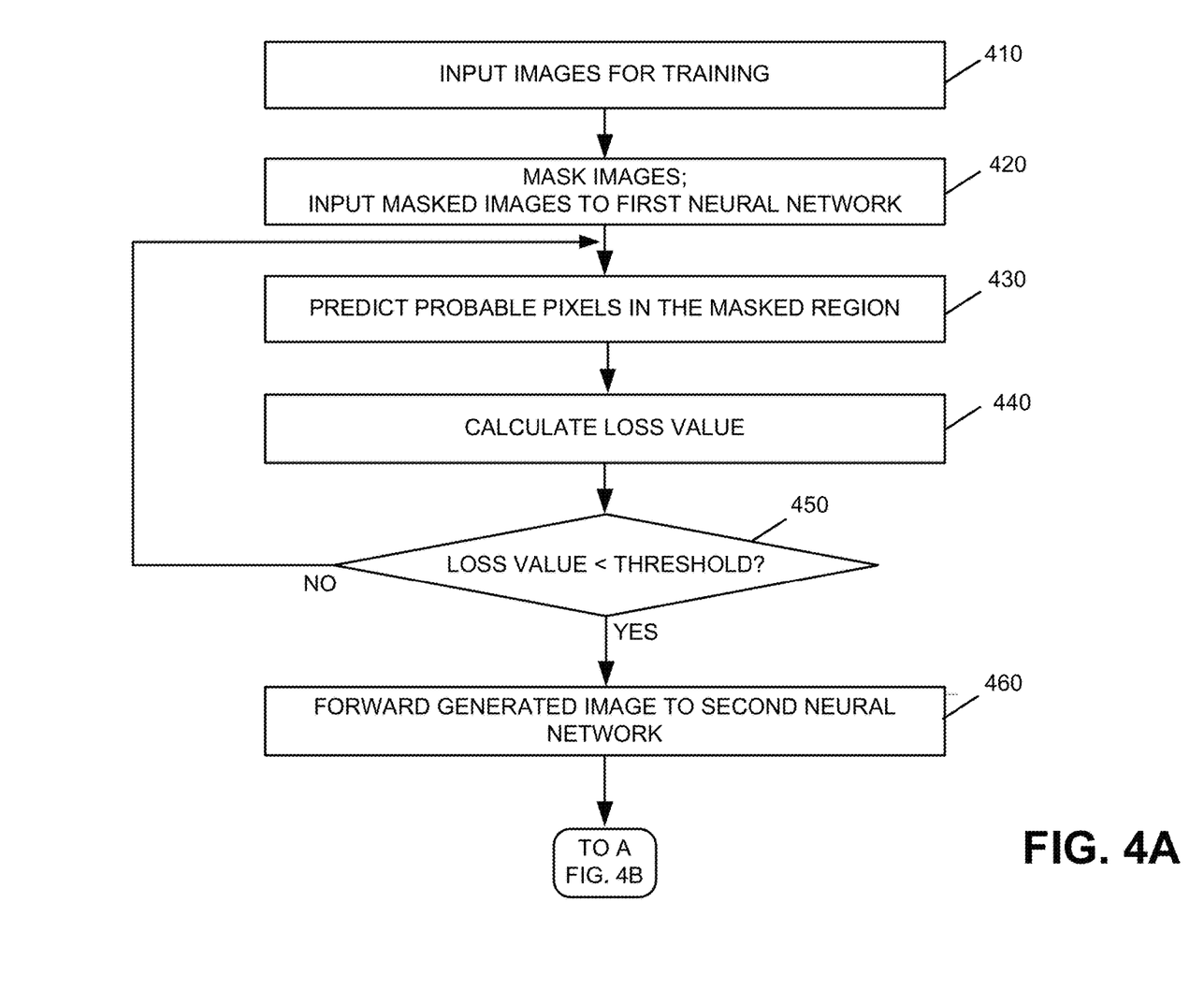
FIGS. 4A and 4B are flow diagrams illustrating processing associated with training the neural networks of FIG. 2 in accordance with an exemplary implementation.
Figure 4B:
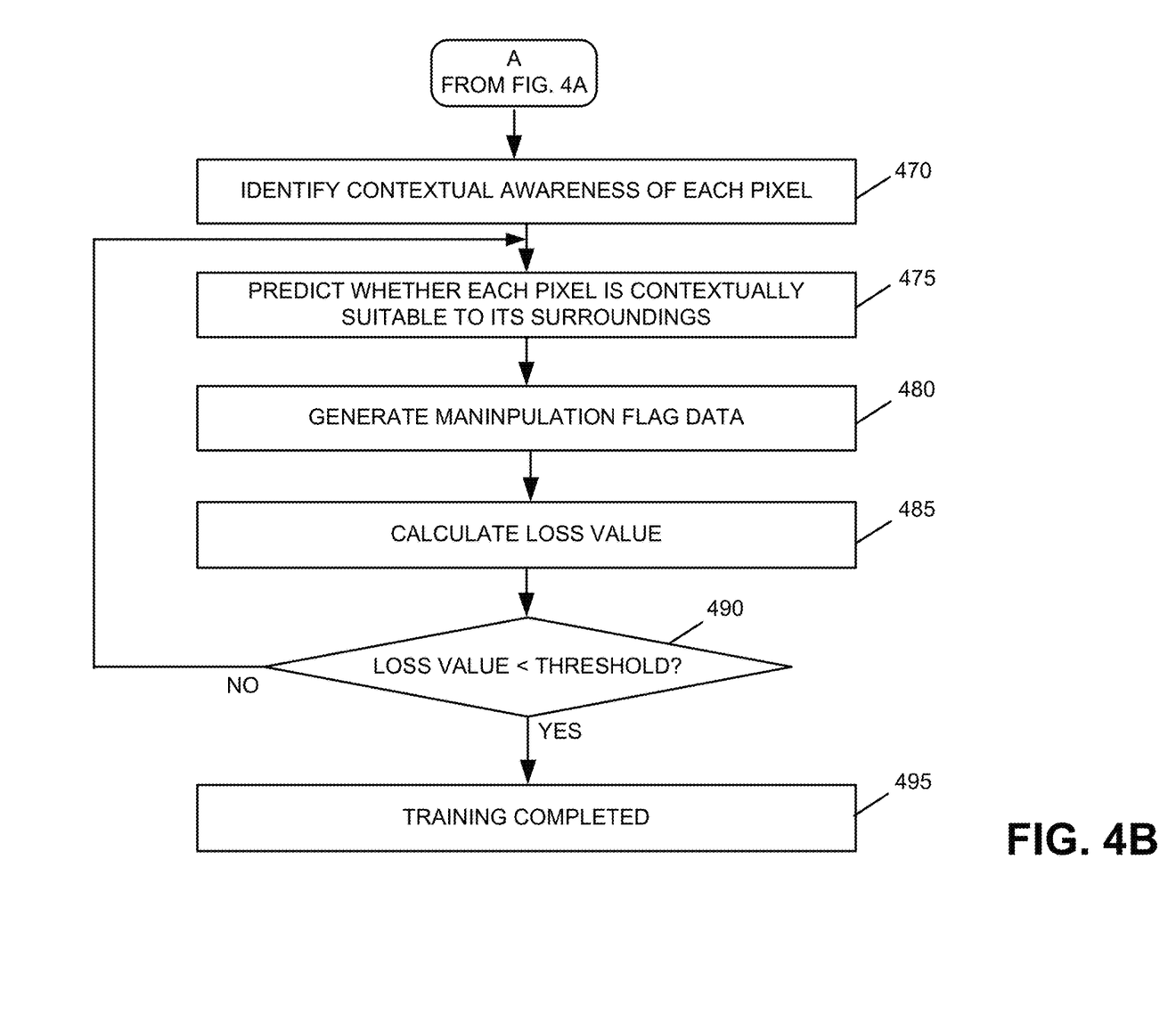

FIGS. 4A and 4B are flow diagrams illustrating processing associated with training neural networks 124 and 126 in accordance with an exemplary implementation. Processing may begin by inputting original images to custom neural networks 120 (block 410). For example, image acquisition unit 110 may input images 210 to image masking device 122. Image masking device 122 may mask one or more portions of the received images (block 420). For example, in one implementation, image masking device 122 may randomly mask (i.e., select) a portion of each of the received images. In other implementations, image masking device 122 may mask received images based on predefined rules. For example, a masking rule may indicate that a configurable portion of an image, such as 15-25% of an image, should be masked in a random manner. Another rule may indicate that particular colors in an image (e.g., red, blue, etc.) should be masked. Still other rules may indicate that particular items in an image, or features in an image determined to be prominent or important should be masked. A prominent or important feature may be, for example, a face of a person in the image, an element located in a central portion of an image, such as a sign, a building, a landmark, etc.

Figure 5:
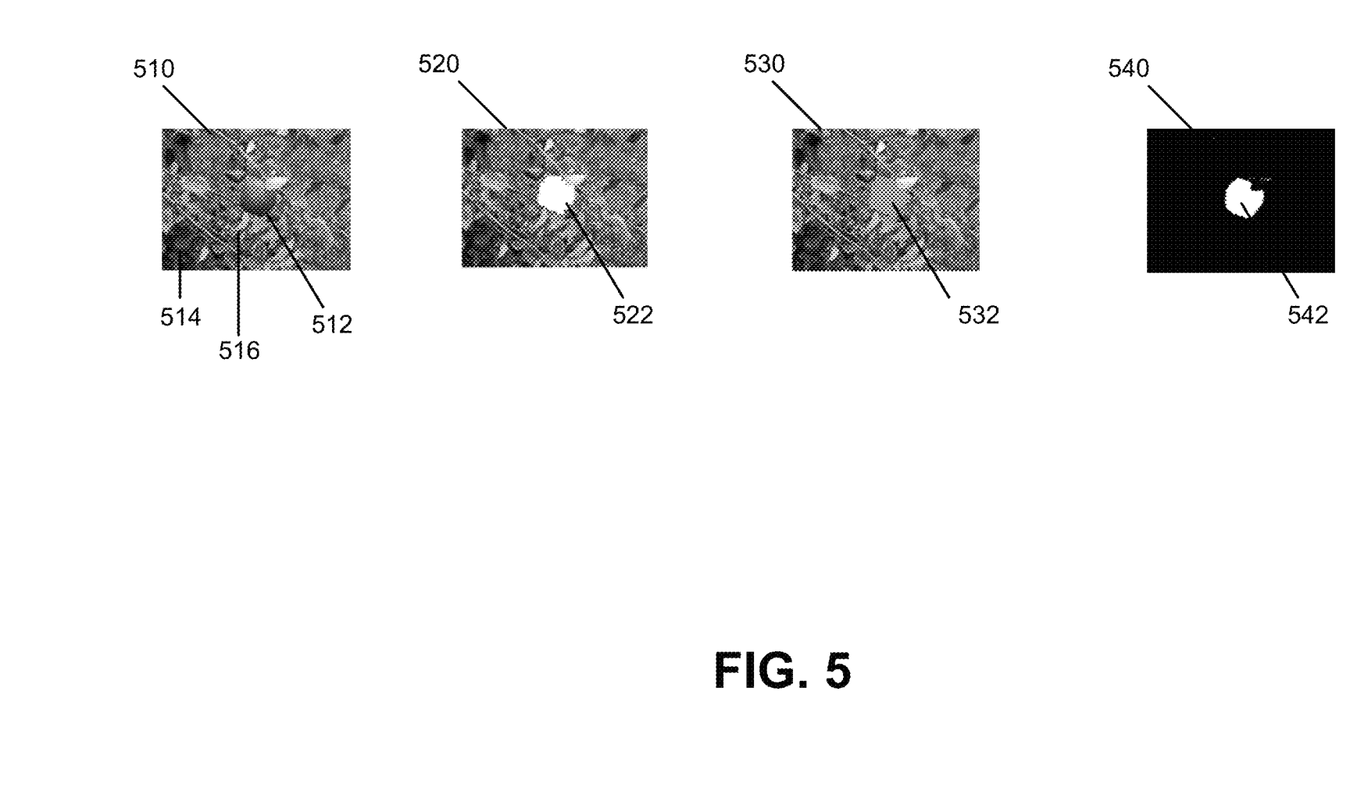
FIG. 5 is a diagram illustrating images associated with the processing of FIGS. 4A and 4B.

As an example, suppose that an image includes a portion of an apple tree, as illustrated in image 510 in FIG. 5. Referring to FIG. 5, image 510 may include a red apple 512 located in a center portion of image 510, one or more other apples, such as apple 514, leaves 516 on the apple tree, etc.

In this example, assume that image masking device 122 masks the region/pixels corresponding to apple 512, as represented by image 520 in FIG. 5. Referring to FIG. 5, image masking device 122 may mask region 522 by setting the pixel values in region 522 to, for example, 255, which corresponds to the color white. In other implementations, image masking device 122 may mask region 522 by setting the pixel values to some other value (e.g., zero, which corresponds to the color black). In each case, image masking device 122 may not mask/modify the remaining portions of image 520. Image masking device 122 may input the masked image to neural network 124 (block 420).

Neural network 124 may process the masked image and learn or identify the contextual awareness of each pixel with respect to its surrounding pixels. For example, neural network 124 may identify the magnitude of each pixel value (e.g., a value from 0 to 255 for a black and white image, or red, green and blue values from 0 to 255 for color images). Neural network 124 may also identify the gradient of the pixel value changes to determine the shape of elements, such as the shape and edges of surrounding areas or objects. For example, in this example, neural network 124 may identify the shape and edges of leaves on the apple tree based on each pixel value and the values of the surrounding pixels. For example, the pixels that define the leaves would be expected to have similar pixel values/colors, as opposed to pixels that define the branches of the apple tree. Neural network 124 may also identify that the color of apple 512 would be expected to be similar to the color of apple 514 in image 510. Neural network 124 may further use the gradient of pixel value changes to identify the shape of objects, such as the shape of an apple, the shapes of branches and leaves, etc. For example, the pixels associated with apples would be expected to have similar shapes. Neural network 124 may then use the identified contextual awareness with respect to the pixel values to predict probable pixel values in the masked region (block 430).

Continuing with the example in FIG. 5, assume that neural network 124 predicts that probable pixel values for masked region 522 correspond to an orange color. In this scenario, neural network 124 generates an orange color value for pixels in masked region 122, as illustrated by region 532 in image 530. That is, region 532 in image 530 is predicted to be orange in color. Neural network 124 may also include a loss function to calculate the difference between the actual pixel values associated with apple 512 in image 510 that has been masked, and the predicted pixel values illustrated in region 532 of image 530 (block 440).

Neural network 124 may then determine if the loss value is less than a predetermined threshold (block 450). If the loss value is not less than the threshold (block 450—no), neural network 124 may back-propagate this learning information to elements of neural network 124 and the process is repeated. That is, blocks 430-450 are repeated, new predictions of probable pixel values are made and new loss values are determined. If, however, the loss value is less than the threshold (block 450—yes), neural network 124 forwards generated image 530 to neural network 126 (block 460). In this way, neural network 124 performs multiple iterations until the loss value with respect to probable pixel values for masked regions is minimal.

Neural network 126 (i.e., the second neural network in this training environment) receives the generated image and learns or identifies contextual awareness of each pixel with respect to its surrounding pixels (FIG. 4B, block 470). For example, neural network 126 may identify the magnitude of each pixel value to attempt to understand or determine the nature of various colors and/or color changes. Neural network 126 may also examine each pixel with respect to the gradient of the pixel value changes to understand shape associated with objects (e.g., the shape of an apple), as well as color changes within an object.

Neural network 126 may then use this information to predict whether each pixel is contextually suitable with respect to its surrounding pixels (block 475). If the pixel is not contextually suitable to its surroundings, neural network 126 generates a flag for that pixel (block 480). Neural network 126 may then generate manipulation flag data, as illustrated in image 540 in FIG. 5. Referring to FIG. 5, image 540 includes a white area 542 surrounded by black areas. This indicates that neural network 126 has output manipulation flag values of, for example, 1 corresponding to white area 542, indicating that pixels in area 542 are not contextually suitable. The remaining areas of image 540 are shown in black indicating that neural network 126 has output flag values of, for example, zero. The zero value indicates that a pixel is contextually suitable to its surrounding pixels.

Neural network 126 may also include a loss function to calculate the difference between the pixels known to have been masked (i.e., region 522 in image 520) with the out of context data corresponding to region 542 in image 540 (block 485). Neural network 126 may then determine if the loss value is less than a predetermined threshold (block 490). If the loss value is not less than the threshold (block 490—no), neural network 126 may back-propagate this learning information to elements of neural network 126 and the process is repeated. That is, blocks 475-490 are repeated. If, however, the loss value is less than the threshold (block 490—yes), neural network 126 determines that training with respect to images 510-540 have been completed (block 495). In this manner, neural network 126 performs multiple iterations with respect to images generated by neural network 124 until the loss value is minimal, indicating that training for an image has been completed.

Training of neural networks 124 and 126 may continue in this manner until a suitable number of images, such as millions of images, have been processed. Trained neural networks 124 and 126 may then be used to detect image manipulation and reconstruct images, as described in detail below.

Figure 6:
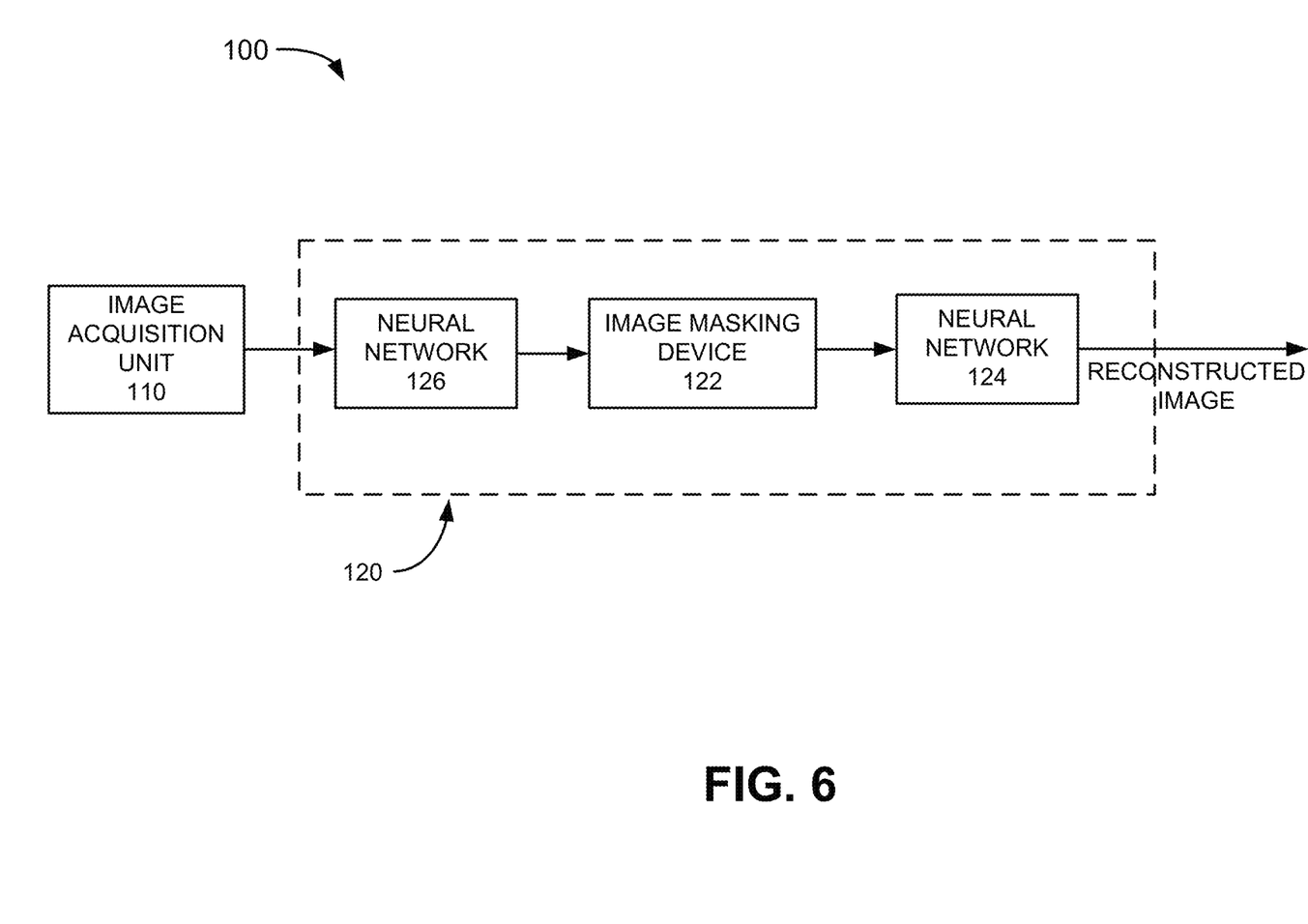
FIG. 6 is a diagram illustrating components of FIG. 1 configured to detect manipulated images and generate reconstructed images in accordance with an exemplary implementation.

FIG. 6 is a block diagram of a configuration of neural networks 120 with respect to making inferences or contextually aware determinations with respect to potentially manipulated images after training has been completed, in accordance with an exemplary implementation. Referring to FIG. 6, neural networks 124 and 126 have essentially changed positions with respect to processing images as compared to the training phase of neural networks 124 and 126. For example, images may be input to neural network 126, which processes the images to detect regions of images that have possibly been manipulated. Neural network 126 may forward manipulated region information to image masking device 122. Image masking device 122 may then mask the images and forward the masked images to neural network 124. Neural network 124 may then generate reconstructed images corresponding to original images, as described in detail below.

Figure 7:
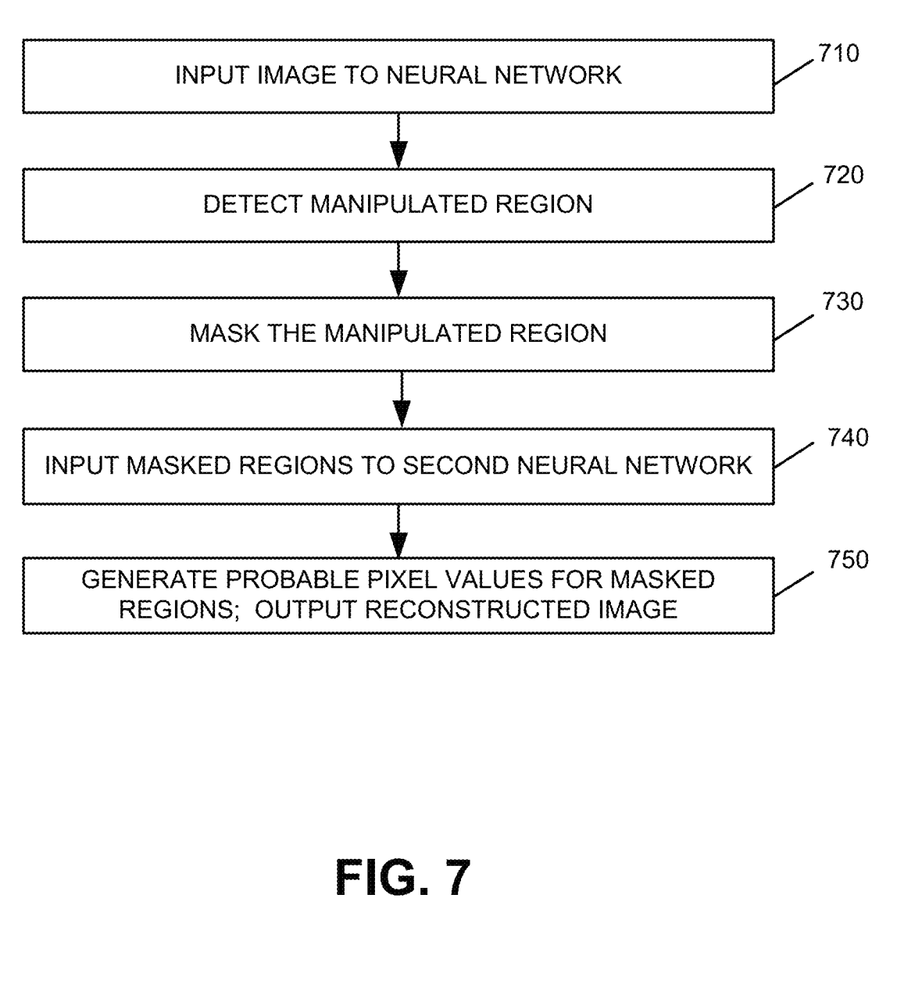
FIG. 7 is a flow diagram associated with detecting manipulated images and generating reconstructed images in accordance with an exemplary implementation.
Figure 8:
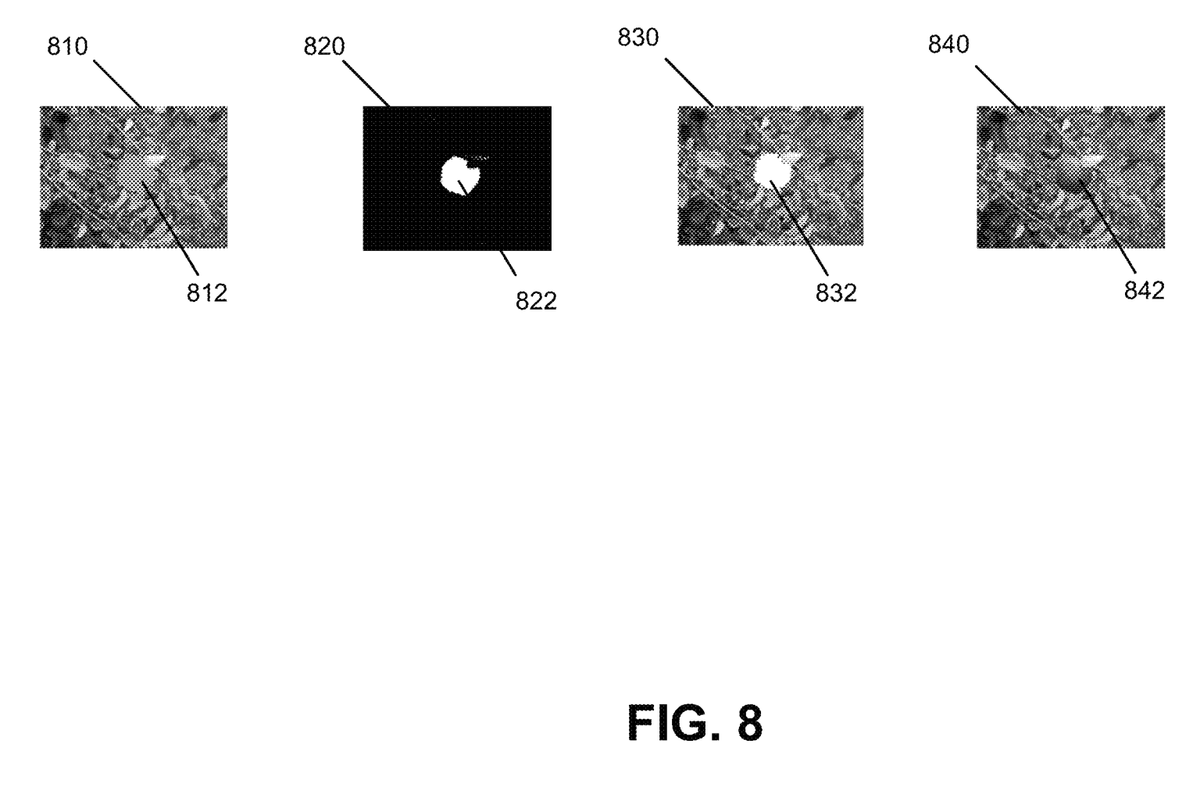
FIG. 8 is a diagram illustrating images associated with the processing of FIG. 7.

FIG. 7 is a flow diagram illustrating exemplary processing associated with identifying manipulated images and generating reconstructed images, in accordance with an exemplary implementation. In FIG. 7, assume that neural networks 124 and 126 have been trained in accordance with the discussion above with respect to FIGS. 4A, 4B and 5. Processing may begin by inputting an image to trained neural networks 120 (block 710). For example, image acquisition unit 110 may input an image to neural network 126, as illustrated in FIG. 6. In this example, assume that the image is an apple tree image 810, as illustrated in FIG. 8. Further assume that the color of the apple located in region 812 of image 810 is orange. That is, image 810 has been digitally altered to have an orange colored apple, as opposed to an original red colored apple.

Neural network 126 may detect manipulated regions of image 810 (block 720). For example, neural network 126 may compare magnitudes of pixel values in image 810 to expected pixel values. Neural network 126 may also compare the gradient with respect to pixel value changes in image 810 to expected gradient changes. Neural network 126 may further compare the shape of objects in image 810 with respect to expected shapes, such as the shape of an orange as opposed to the shape of an apple. In this example, neural network 126 may identify region 812 as being a manipulated portion of image 810.

Neural network 126 may then generate manipulated flag data corresponding to image 820 illustrated in FIG. 8. For example, neural network 126 may assign information to each pixel in image 810 corresponding to whether each pixel is contextually suitable with respect to surrounding pixels. In this example, the contextually suitable pixels may be assigned a value of zero and the pixels that are not contextually suitable may be assigned a value of 255 (e.g., corresponding to white), resulting in image 820 illustrated in FIG. 8.

Neural network 126 may forward this manipulation flag data to image masking device 122. Image masking device 122 may then mask the manipulated region of image 820 (block 730). For example, image masking device 122 may mask region 822 in image 820 and leave the other regions of image 820 as unmodified, resulting in image 830 which includes masked region 832, illustrated in FIG. 8.

Imaging masking device 122 may forward the masked image to neural network 124 (block 740). Neural network 124 may then generate probable pixel values for the pixels within masked region 832 (block 750). For example, based on the magnitude of the color, gradient of pixel changes, expected shapes of objects, etc., which were learned during the training phase of neural network 124, neural network 124 may determine that masked region 832 should be red in color. Neural network 124 may then output a reconstructed image, such as image 840 in FIG. 8 (block 750). Referring to FIG. 8, region 842 in the reconstructed image is red in color, corresponding to a red apple that was included in an original image. In this manner, trained neural networks 126 and 124 may be used to identify manipulated regions of images, as well as generate reconstructed images that correspond to original images. For example, the reconstructed images may be identical to or nearly identical to the original images.

Implementations described herein provide multiple neural networks that are trained using contextual knowledge of pixels with respect to surrounding pixels to identify out-of-context pixels or pixel regions. The trained neural networks may then receive images, identify manipulated regions of the images and reconstruct the regions of the images that have been manipulated or digitally altered. This may allow a service provider or other entity associated with vetting images to identify alterations and provide corrected/reconstructed images that are identical to or closely resemble original images.

The foregoing description of example implementations provides illustration and description, but is not intended to be exhaustive or to limit the embodiments to the precise form disclosed. Modifications and variations are possible in light of the above teachings or may be acquired from practice of the embodiments.

For example, features have been described with respect to randomly masking portions of images during training or masking images based on particular rules. In some implementations, such as implementations concerned with detecting particular types of manipulated images, the masking rules may be tailored to mask particular portions of the images. For example, for implementations associated with identifying manipulated images of people, faces and/or bodies of people in images may be masked during the training phase. This may allow the neural networks to be trained more quickly, as well as improve the accuracy with respect to identifying manipulated images involving people. In such implementations, the kernels and/or filters of the neural networks may also be customized based on the particular images or portions of images that are of interest.

Further, features have been mainly described above with respect to identifying manipulated regions of color images and then reconstructing the manipulated regions. Implementations described above may also be used in connection with identifying manipulated portions of black and white images and reconstructing black and white images. For example, black and white images will include gradients or shades with respect to image pixel values (e.g., values from 0 to 255) within an image, as well as shape related context information and other information. This gradient/shade information, shape related information, etc., may be used by neural networks 120 for training purposes as described above, and then be used to identify out-of-context pixels and generate reconstructed images in a similar manner as also described above.

In addition, features have been mainly described above with respect to identifying manipulated regions of images. In other implementations, videos may be processed in a similar manner to identify modified portions of the videos and/or reconstruct the videos to correct or reconstruct the video.

Further, while series of acts have been described with respect to FIGS. 4A, 4B and 7, the order of the acts may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   receiving a plurality of images to train a first neural network;
   masking a portion of each of the plurality of images;
   inputting the masked images to the first neural network;
   generating, by the first neural network, probable pixel values for pixels located in the masked portion of each of the plurality of images;
   forwarding the images including the probable pixel values to a second neural network;
   determining, by the second neural network, whether each of the probable pixel values is contextually suitable;
   identifying pixels in each of the plurality of images that are not contextually suitable;
   receiving, by the second neural network, a first image;
   detecting, by the second neural network, a manipulated region of the first image; and
   masking the manipulated region of the first image.

2. The method of claim 1, further comprising:
   inputting the masked first image to the first neural network; and
   generating, by the first neural network, a reconstructed first image.

3. The method of claim 2, wherein generating the reconstructed first image comprises:
   determining probable pixel values for pixels located in the manipulated region.

4. The method of claim 1, wherein the masking a portion of each of the plurality of images comprises:
   masking a random portion of each of the plurality of images.

5. The method of claim 1, wherein the masking a portion of each of the plurality of images comprises:
   masking a predetermined percentage of each of the plurality of images.

6. The method of claim 1, wherein the masking a portion of each of the plurality of images comprises at least one of:
   masking particular portions of each of the plurality of images, or
   masking portions of each of the plurality of images determined to be important or prominent.

7. The method of claim 1, further comprising:
   determining, by the first neural network, whether the probable pixel values for each image are within a predetermined range of original pixel values associated with the masked portion of each corresponding image.

8. The method of claim 7, further comprising:
   repeating the generating probable pixel values in response to determining that the probable pixel values are not within the predetermined range of the original pixel values.

9. A system, comprising:
   at least one processing device configured to implement a first neural network and a second neural network to process images, wherein the at least one processing device is configured to:
   receive a plurality of images;
   mask a portion of each of the plurality of images;
   input the masked images for processing by the first neural network;
   generate, by the first neural network, probable pixel values for pixels located in the masked portion of each of the plurality of images;
   forward the images including the probable pixel values to the second neural network;
   determine, by the second neural network, whether each of the probable pixel values is contextually suitable;
   identify pixels in each of the plurality of images that are not contextually suitable;
   receive, by the second neural network, a first image;
   detect, by the second neural network, a manipulated region of the first image; and
   mask the manipulated region of the first image.

10. The system of claim 9, wherein the at least one processing device is further configured to:
    input the masked first image to the first neural network; and
    generate, by the first neural network, a reconstructed first image.

11. The system of claim 10, wherein when generating the reconstructed first image, the first neural network is configured to:
    determine probable pixel values for pixels located in the manipulated region.

12. The system of claim 9, wherein when masking a portion of each of the plurality of images, the at least one processing device is configured to:
    mask a random portion of each of the plurality of images.

13. The system of claim 9, wherein when masking a portion of each of the plurality of images, the at least one processing device is configured to:
    mask a predetermined percentage of each of the plurality of images.

14. The system of claim 9, wherein when masking a portion of each of the plurality of images, the at least one processing device is configured to at least one of:
    mask particular portions of each of the plurality of images, or
    mask portions of each of the plurality of images determined to be important or prominent.

15. The system of claim 9, wherein the at least one processing device is further configured to:
    determine, by the first neural network, whether the probable pixel values for each image are within a predetermined range of original pixel values associated with the masked portion of each corresponding image.

16. The system of claim 15, wherein the at least one processing device is further configured to:
    repeat the generating probable pixel values in response to determining that the probable pixel values are not within the predetermined range of the original pixel values.

17. A non-transitory computer-readable medium having stored thereon sequences of instructions which, when executed by at least one processor configured to implement a first neural network and a second neural network, cause the at least one processor to:
- receive a plurality of images;
- mask a portion of each of the plurality of images;
- input the masked images for processing by the first neural network;
- generate, by the first neural network, probable pixel values for pixels located in the masked portion of each of the plurality of images;
- forward the images including the probable pixel values to the second neural network;
- determine, by the second neural network, whether each of the probable pixel values is contextually suitable;
- identify pixels in each of the plurality of images that are not contextually suitable;
- receive, by the second neural network, a first image;
- detect, by the second neural network, a manipulated region of the first image; and
- mask the manipulated region of the first image.

18. The non-transitory computer-readable medium of claim 17, wherein the instructions further cause the at least one processor to:
- input the masked first image to the first neural network; and
- generate, by the first neural network, a reconstructed first image.

19. The non-transitory computer-readable medium of claim 18, wherein when generating the reconstructed first image, the instructions further cause the at least one processor to:
- determine probable pixel values for pixels located in the manipulated region.

20. The non-transitory computer-readable medium of claim 17, wherein when making a portion of each of the plurality of images, the instructions further cause the at least one processor to at least one of:
- mask a random portion of each of the plurality of images,
- mask a predetermined percentage of each of the plurality of images,
- mask particular portions of each of the plurality of images, or
- mask portions of each of the plurality of images determined to be important or prominent.

* * * * *